(12) United States Patent
Yamate et al.

(10) Patent No.: US 6,363,180 B1
(45) Date of Patent: Mar. 26, 2002

(54) METHODS AND APPARATUS FOR ENHANCING DYNAMIC RANGE, SENSITIVITY, ACCURACY, AND RESOLUTION IN FIBER OPTIC SENSOR SYSTEMS

(75) Inventors: Tsutomu Yamate, Brookfield; Robert J. Schroeder, Newtown; Rogerio T. Ramos, Bethel, all of CT (US); Eric Udd, Troutdale, OR (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/303,163

(22) Filed: Apr. 30, 1999

(51) Int. Cl.⁷ .............................. G02B 6/00; G02B 6/34; G01J 4/00
(52) U.S. Cl. ............................. 385/12; 385/11; 385/37; 356/35.5; 356/364
(58) Field of Search ................................ 385/11.12, 37; 356/35.5, 351, 364–370

(56) References Cited

U.S. PATENT DOCUMENTS

| | | | |
|---|---|---|---|
| 4,787,741 A | * 11/1988 | Udd et al. ................... 356/35.5 |
| 5,118,931 A | * 6/1992 | Udd et al. ................... 250/227.16 |
| 5,444,803 A | 8/1995 | Kim et al. ...................... 385/28 |
| 5,564,832 A | * 10/1996 | Ball et al. ..................... 374/161 |
| 5,788,632 A | * 8/1998 | Pezzaniti et al. ............. 600/316 |
| 5,818,585 A | 10/1998 | Davis et al. ................. 356/345 |
| 5,828,059 A | 10/1998 | Udd ....................... 250/227.18 |
| 5,841,131 A | 11/1998 | Schroeder et al. ..... 250/227.17 |
| 6,195,162 B1 | * 2/2001 | Varnham et al. ............. 356/345 |

FOREIGN PATENT DOCUMENTS

| | | | |
|---|---|---|---|
| FR | 2 703 541 | 10/1994 | ............ H04J/14/06 |
| WO | WO 90/01149 | 2/1990 | ............ G01H/9/00 |

* cited by examiner

Primary Examiner—Rodney Bovernick
Assistant Examiner—Juliana K. Kang
(74) Attorney, Agent, or Firm—William B. Batzer; David P. Gordon

(57) ABSTRACT

Methods for enhancing dynamic range, sensitivity, accuracy, and resolution in fiber optic sensors include manipulating the polarization characteristics of the light entering a fiber optic sensor and/or manipulating the polarization characteristics of the light exiting the sensor before it enters the light detection system. An apparatus according to the invention includes a fiber optic core having one or more gratings written onto it, a light source and a detection system for detecting light transmitted through the grating or reflected by the grating. The light source and the spectral demodulation system may be coupled to opposite ends of the fiber optic (transmission mode) or may be coupled to the same end of the fiber optic through the use of a beam splitter and terminators (reflection mode). Apparatus according to the invention include a polarizer and controller located either between the light source and the fiber or between the fiber and the detection system. Other embodiments of the invention include a depolarizing scrambler before the detection system so that the light entering the detection system is depolarized. According to other embodiments, two detection systems are coupled to the fiber by a beam splitter.

37 Claims, 10 Drawing Sheets

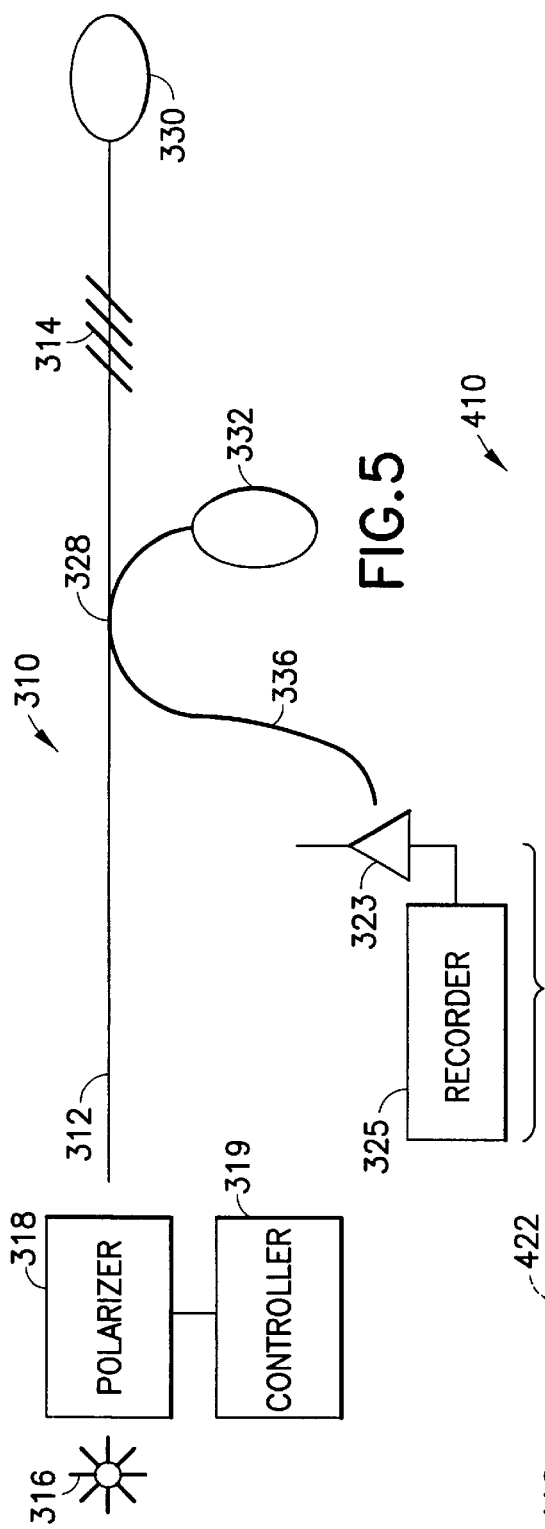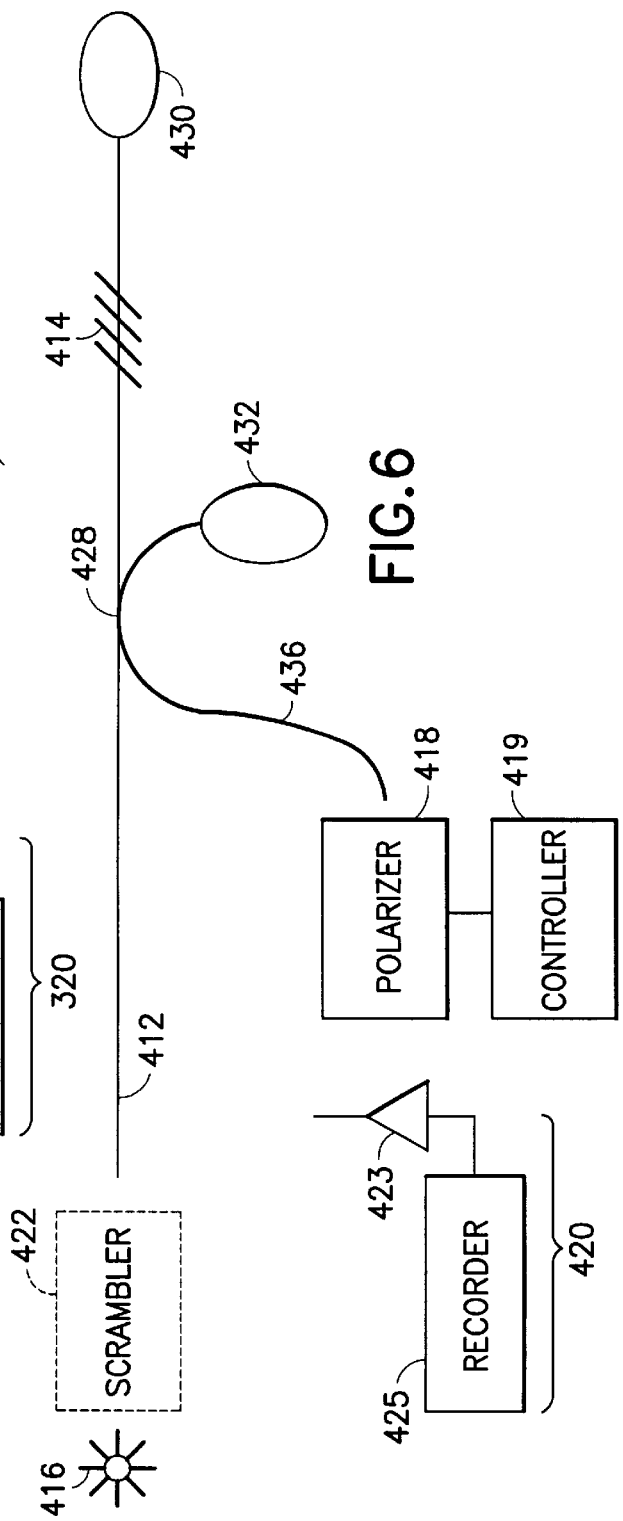

METHODS AND APPARATUS FOR ENHANCING DYNAMIC RANGE, SENSITIVITY, ACCURACY, AND RESOLUTION IN FIBER OPTIC SENSOR SYSTEMS

BACKGROUND OF THE INVENTION

1. Field of the Invention

The invention relates to fiber optic sensor systems. More particularly, the invention relates to methods and apparatus for enhancing dynamic range, sensitivity, accuracy, and resolution in FBG fiber optic sensor systems. As used herein, the term "dynamic range" refers to the difference between the lowest value and the highest value a sensor is capable of detecting; the term "sensitivity" refers to the lowest value a sensor is capable of detecting; the term "accuracy" refers to whether the values detected by the sensor are truly representative of what is being sensed; and the term "resolution" refers to how many units of values can be detected over a sensor's dynamic range.

2. State of the Art

Fiber optic sensor technology has developed concurrently with fiber optic telecommunication technology. The physical aspects of optical fibers which enable them to act as wave guides for light are affected by environmental influences such as temperature, pressure, and strain. These aspects of optical fibers which may be considered a disadvantage to the telecommunications industry are an important advantage to the fiber optic sensor industry.

Optical fibers, whether used in telecommunications or as environmental sensors, generally include a cylindrical core, a concentric cylindrical cladding surrounding the core, and a concentric cylindrical protective jacket or buffer surrounding the cladding. The core is made of transparent glass or plastic having a certain index of refraction. The cladding is also made of transparent glass or plastic, but having a different, smaller, index of refraction. The ability of the optical fiber to act as a bendable waveguide is largely determined by the relative refractive indices of the core and the cladding.

The refractive index of a transparent medium is the ratio of the velocity of light in a vacuum to the velocity of light in the medium. As a beam of light enters a medium, the change in velocity causes the beam to change direction. More specifically, as a beam of light travels from one medium into another medium, the beam changes direction at the interface of the two media. In addition to changing direction at the interface of two media, a portion of the incident beam is reflected at the interface such that the energy of the beam travelling through the second medium is diminished (the sum of the energy of the refracted and reflected beams must equal the energy of the incident beam). The angles of reflection and refraction can be predicted using Snell's law if the refractive indices of both media are known.

By altering the indices of refraction of two adjacent media, the angle of refraction and the angle of reflection of a beam travelling toward the interface of the two media can be altered such that the intensity of the light entering the second medium approaches zero and substantially all of the light is reflected at the interface. Conversely, for any two transparent media, there is a critical angle of incidence at their interface at or below which substantially all of the incident light will be reflected. This phenomenon, known as total internal reflection, is applied in choosing the refractive indices of the core and the cladding in optical fibers so that light may propagate through the core of the fiber with minimal power loss.

Many other factors affect the propagation of light through the fiber optic core, including the dimensions of the core and the cladding, the wavelength of the light, the magnetic field vectors of the light and electrical field vectors of the light. In addition, many of the physical laws used to determine the ideal propagation of light through a wave guide (optical fiber) assume an "ideal" wave guide, i.e. a straight wave guide with perfect symmetry and no imperfections. For example, the diameter of the core and the wavelength of the light transmitted through it will determine whether the fiber optic is "single model" or "multimode". The terms single mode and multimode refer to the dimensional orientation of rays propagating through the fiber. Single mode fibers have a core with a relatively small diameter (2–12 microns) and support only one spatial mode of propagation. Multimode fibers have a core with a relatively large diameter (25–75 microns) and permit non-axial rays or modes to propagate through the core. The so-called single mode fibers are actually two mode fibers in the sense that there are two different states of optical polarization that can be propagated through the core. In an ideal, straight, imperfection-free fiber with perfect circular symmetry, the propagation velocity of light is independent of the direction of polarization.

A fiber with an elliptical core will have two preferred directions of polarization (along the major axis and along the minor axis). Linearly polarized light injected into the fiber at any other direction of polarization will propagate in two separate modes that travel at slightly different velocities. This type of fiber is said to have a "modal birefringence". In a real fiber of this type, even ideally polarized light will couple into the other mode due to imperfections in the core-cladding interface, index of refraction fluctuations, and other mechanisms. Static and dynamic changes in polarization may occur along the entire length of the fiber. Over a given distance, the phases of the two modes will pass through an entire cycle of being in phase and out of phase. This distance is known as the "beat length". A long beat length is associated with a small birefringence and a short beat length is associated with a large birefringence. Birefringent optical fibers are also known as "polarization preserving fibers" or "polarization maintaining (PM) fibers". Birefringence is achieved by providing a core with an elliptical cross section or by providing circular core with a cladding which induces stress on the core. For example, the cladding may be provided with two parallel stress members having longitudinal axes which lie in the same plane as the axis of the core.

As mentioned above, fiber optic sensor employ the fact that environmental effects can alter the amplitude, phase, frequency, spectral content, or polarization of light propagated through an optical fiber. The primary advantages of fiber optic sensors include their ability to be light weight, very small, passive, energy efficient, rugged, and immune to electromagnetic interference. In addition, fiber optic sensors have the potential for very high sensitivity, large dynamic range, and wide bandwidth. Further, a certain class of fiber sensors may be distributed or multiplexed along a length of fiber. They may also be embedded into materials.

State of the art fiber optic sensors can be classified as either "extrinsic" or "intrinsic". Extrinsic sensors rely on some other device being coupled to the fiber optic in order to translate environmental effects into changes in the properties of the light in the fiber optic. Intrinsic sensors rely only on the properties of the optical fiber in order to measure ambient environmental effects. Known fiber optic sensors include linear position sensors, rotational position sensors, fluid level sensors, temperature sensors, strain gauges, fiber optic gyroscopes, and pressure sensors.

One type of fiber optic pressure sensor takes advantage of the fact that ambient pressure places a strain on the jacket of an optical fiber which strains the cladding, thereby straining the core and changing the birefringence of the fiber. When a force is applied transversely to the fiber, the birefringence of the fiber changes, which changes the beat length and thus the intensity of light viewed by an intensity detector. Another type of fiber optic sensor utilizes intra-core fiber gratings as disclosed in U.S. Pat. No. 5,380,995 to Udd et al., the complete disclosure of which is incorporated by reference herein. Intra-core Bragg gratings are formed in a fiber optic by doping an optical fiber with material such as germania and then exposing the side of the fiber to an interference pattern to produce sinusoidal variations in the refractive index of the core. Two presently known methods of providing the interference pattern are by holographic imaging and by phase mask grating. Holographic imaging utilizes two short wavelength (usually 240 nm) laser beams which are imaged through the side of a fiber core to form the interference pattern. The bright fringes of the interference pattern cause the index of refraction of the core to be "modulated" resulting in the formation of a fiber grating. Similar results are obtained using short pulses of laser light, writing fiber gratings line by line through the use of phase masks. By adjusting the fringe spacing of the interference pattern, the periodic index of refraction can be varied as desired. Another method of writing the grating on the fiber is to focus a laser through the side of the fiber and write the grating one line at a time.

When a fiber optic is provided with a grating and subjected to transverse strain, two spectral peaks are produced (one for each polarization axis) and the peak to peak separation is proportional to the transverse strain. Spectral demodulation systems such as tunable Fabry-Perot filters, acousto-optical filters, or optical spectrum analyzers coupled to the fiber detect the two spectral outputs. The spectral outputs are analyzed and the transverse strain is determined by measuring the peak to peak separation. Depending on how the fiber optic is deployed, the transverse strain may be related to temperature, pressure, or another environmental measure.

There are two shortcomings of this type of sensor system. First, dual peaks are only discernable in ordinary single mode fiber when there is considerable transverse strain, e.g. at very high pressure. Various structures are disclosed for mechanically influencing the fiber such that isotropic forces are converted to anisotropic forces to produce birefringence and to magnify the effect of transverse strain on birefringence. Exemplary structures are disclosed in co-owned U.S. Pat. No. 5,841,131. Nevertheless, mechanical structures can only do so much to enhance the sensitivity of fiber optic sensors. One of the disadvantages of the mechanical structure solution is that it cannot be retro-fitted to existing sensors which are embedded in materials.

The other shortcoming of this type of sensor involves characteristics of the spectral demodulation system. The inventors have discovered that, depending on the polarization of the light detected, detection errors of about ±20 picometers occur when using at least some types of Fabry-Perot filters. The polarization state of the light viewed by the demodulation system is changed by lifting, rotating, or twisting any part of the fiber between the Bragg grating and the demodulation system. Therefore, in practical applications, the polarization state of the light viewed by the demodulation system cannot be accurately predicted.

SUMMARY OF THE INVENTION

It is therefore an object of the invention to provide methods and apparatus for enhancing dynamic range and resolution in a fiber optic sensor system utilizing a fiber Bragg grating (FBG).

It is also an object of the invention to provide methods and apparatus for increasing the sensitivity of FBG fiber optic sensor systems.

It is another object of the invention to provide methods and apparatus for minimizing errors in measurement by spectral demodulation systems in FBG fiber optic sensor systems.

In accord with these objects which will be discussed in detail below, the methods of the present invention include manipulating the polarization characteristics of the light entering a fiber optic sensor and/or manipulating the polarization characteristics of the light exiting the sensor before it enters the light detection system. It has been discovered by the inventors that by polarizing the light entering or leaving the system to certain orientations, dual peaks can be discerned with relatively low transverse strain. Further, the inventors have discovered that the errors introduced by a spectral demodulation system can be substantially reduced when a depolarizing "scrambler" is deployed between the fiber and the spectral demodulation system. An apparatus according to the invention includes a fiber optic core having one or more gratings written onto it, a light source (such as an LED, a laser, a wavelength tunable light source, or a laser diode) and a detection system for detecting light transmitted through the grating or reflected by the grating. The light source and the detection system may be coupled to opposite ends of the fiber optic (transmission mode) or may be coupled to the same end of the fiber optic through the use of a beam splitter and terminators (reflection mode). The methods of the invention may be implemented in several different apparatus depending on what kind of light source is used, what kind of detection system is used, etc.

According to a first embodiment, a polarizer and controller is placed in front of a broad band light source so that light entering the fiber optic sensor is polarized. An optional depolarizing "scrambler" is also placed in front of the detection system which includes a spectral demodulator and photo detector. As the polarization of the light entering the sensor is adjusted to the correct orientation, a first peak is detected. Further adjustment of the polarization (±90°) allows a second peak to be detected. An alternative first embodiment utilizes a polarized light source and polarization rotator in lieu of the unpolarized broad band light source, the polarizer and controller. The detection system and the light source in all embodiments may be located either at opposite ends of the fiber optic, or via use of a beam splitter, at the same end of the fiber optic.

A second embodiment of the invention is similar to the first embodiment except that the polarizer and controller is placed between the sensor and the scrambler.

A third embodiment of the invention is similar to the second embodiment except that two separate detection systems, two scramblers, and a polarizing beam splitter are provided. Also, instead of a polarizer and a controller, a polarization rotator is provided between the sensor and the polarizing beam splitter. Light from the polarization rotator enters the beam splitter where two orthogonally polarized beams exit, one toward each detection system. As each detection system includes a spectral demodulator, a scrambler is provided between the beam splitter and each detector. When the angle of the polarized light exiting the sensor is adjusted to the correct orientation using the polarization rotator, the beam splitter provides two beams each of which represent one of the two peaks. The two peaks are therefor detected simultaneously, one by each of the two detection systems.

According to a fourth embodiment, a polarizer and controller is placed in front of a tunable light source and no special equipment is placed between the sensor and the detection system which does not include a spectral demodulator. The wavelength of the light source is tuned through the wavelength of the grating. As the polarization of the light entering the sensor is adjusted to the correct orientation, a first peak is detected, and further adjustment of the polarization (±90°) and the wavelength of the light source allows a second peak to be detected. If the system does not contain any components which are adversely affected by polarized light a scrambler may not be needed.

A fifth embodiment is similar to the fourth embodiment except that the polarizer and controller is placed between the sensor and the detection system rather than the light source. The wavelength of the light source is tuned through the wavelength of the grating. As the polarization of the light entering the sensor is adjusted to the correct orientation, a first peak is detected, and further adjustment of the polarization (±90°) and the wavelength of the light source allows a second peak to be detected. If the system does not contain any components which are adversely affected by polarized light a scrambler may not be needed.

A sixth embodiment of the invention is similar to the fifth embodiment except that two detection systems are provided and a polarizing beam splitter is used to couple the two detection systems to the polarization controller.

The invention can be used in many different types of fiber optic sensors including sensors which include multiple gratings and light sources with multiple frequencies. Additional objects and advantages of the invention will become apparent to those skilled in the art upon reference to the detailed description taken in conjunction with the provided figures.

BRIEF DESCRIPTION OF THE DRAWINGS

FIG. 1a is a schematic diagram of an alternative first embodiment of the invention utilizing a polarized light source;

FIG. 5 is a schematic diagram of a fourth embodiment of the invention;

FIG. 6 is a schematic diagram of a fifth embodiment of the invention;

DETAILED DESCRIPTION OF THE PREFERRED EMBODIMENTS

Figure 1:
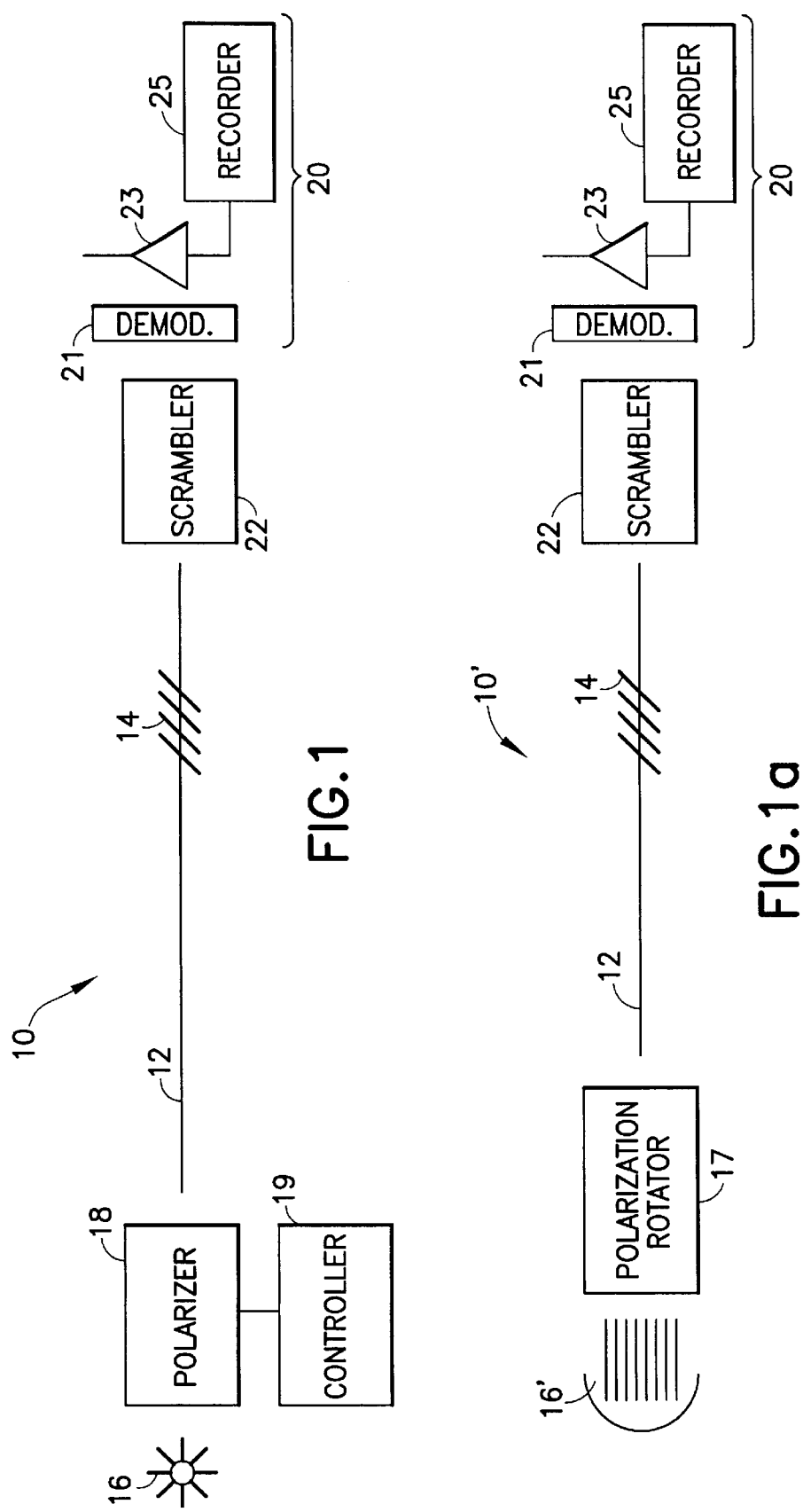
FIG. 1 is a schematic diagram of a first embodiment of the invention utilizing a transmission mode where the light source and the detection system are at opposite ends of the fiber optic sensor.
Figure 2:
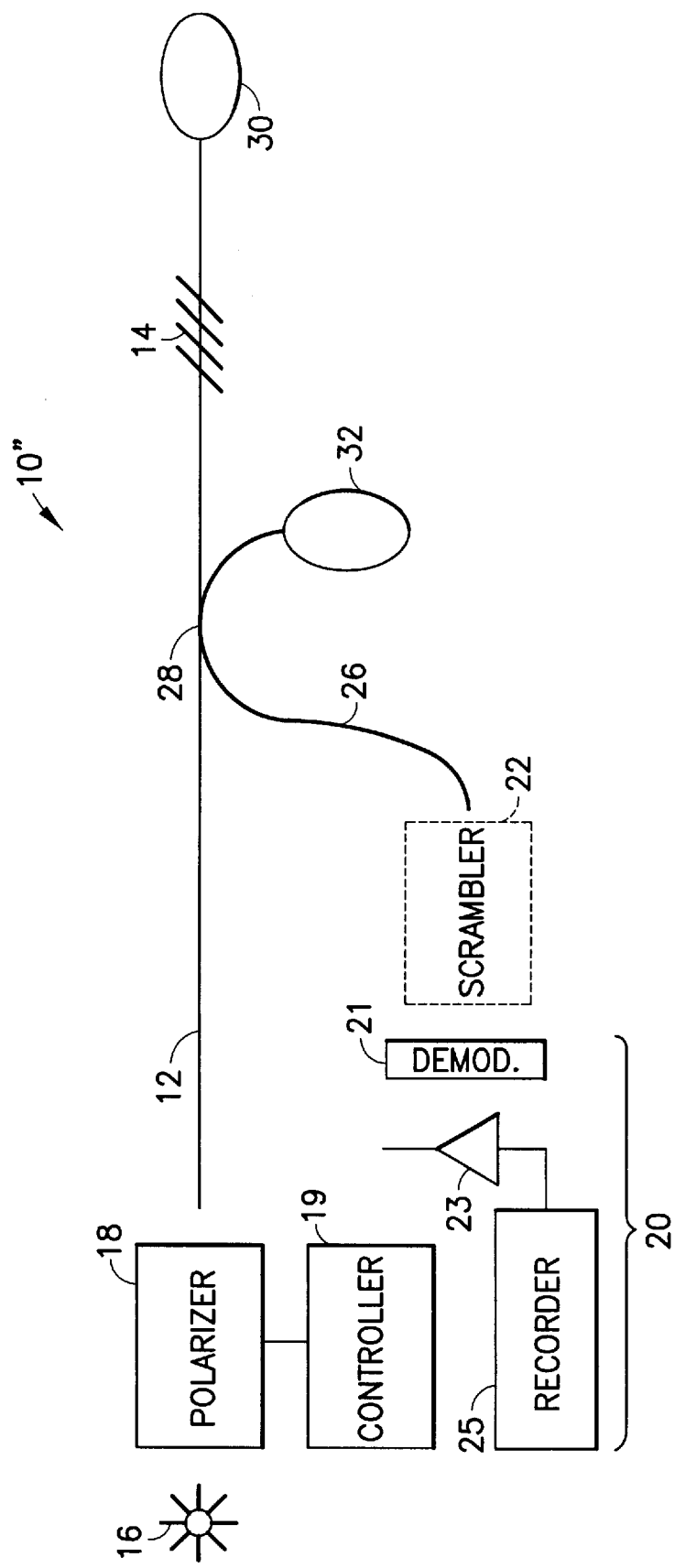
FIG. 2 is a schematic diagram of another alternative first embodiment of the invention utilizing a reflection mode where the light source and the detection system are at the same end of the fiber optic sensor.

FIG. 1 illustrates a first embodiment of a fiber optic sensor system 10 according to the invention. According to the first embodiment, the sensor system 10 includes a fiber optic core 12 having one or more gratings 14 written onto it, an unpolarized broad band light source 16 with a polarizer 18 having a controller 19 mounted between the light source 16 and the fiber optic 12, a detection system 20, and an optional but preferred depolarizing scrambler 22 mounted between the fiber optic 12 and the detection system 20. Commercial polarization scramblers are available from a number of sources. Some scramblers use coils of single mode fiber with a small enough diameter to have significant bend induced birefringence. Usually three coils are mounted in line and their angular orientation is swept to scramble polarization. Other scramblers utilize transverse force applied randomly to a fiber to induce random birefringence and thereby alter the polarization state in a random manner. Still another depolarization scrambler is made from two unequal lengths of polarization maintaining birefringent fiber spliced with a 45° orientation between their polarization axes. This type of scrambler is passive and is particularly effective with a broad band light source. The detection system 20 includes a spectral demodulator 21, a photo detector 23, and a "recorder" 25. The "recorder" 25 contains the electronics which interprets the demodulated signal and records measurements. The orientation of the polarizer 18 is adjusted by the controller 19 so that a first peak is detected by the detection system 20 and is then adjusted approximately ±90° so that a second peak is detected. The angular orientation of the polarizer 18 which will produce two peaks will depend on various characteristics of the fiber optic core 12 and the grating(s) 14. Those skilled in the art will appreciate that some kind of automatic feedback circuit (not shown) is preferably coupled to the controller 19 and the detection system 20 so that the detection and measurement of each of the two peaks may be automated. As shown in FIG. 1, the light source 16 and the detection system 20 are located at opposite ends of the fiber optic 12. Those skilled in the art will appreciate, however, that it is often more convenient to locate the light source and the detection system at the same end of the fiber optic. FIG. 2 discussed below illustrates the first embodiment of the invention with conventional means for locating the light source and the detection system at the same end of the fiber optic.

FIG. 1a shows an alternate first embodiment of the invention which utilizes a polarized light source 16'. The sensor system 10' is similar to the sensor system 10 described above. However, when the light source 16' is polarized, a polarization rotator 17 is used in lieu of a polarizer and controller. The polarization rotator 17 effectively changes the angular orientation of the polarization axes of the polarized light.

Turning now to FIG. 2, another alternate arrangement of a fiber optic sensor system 10' according to the first embodiment of the invention includes a fiber optic core 12 having one or more gratings 14 written onto it, an unpolarized broad band light source 16 with a polarizer 18 having a controller 19 mounted between the light source 16 and the fiber optic 12, a detection system 20, and a depolarizing scrambler 22.

According to this embodiment, a second fiber optic core 26 is coupled to the first fiber optic core 12 by a beam splitter 28 and the free ends of the fiber optics 12 and 26 are terminated with terminators 30, 32. The terminators are well known in the art of fiber optic sensors and serve to absorb rather than reflect light. They may be made of silicon oil, optical gel, etc. In this embodiment, the scrambler 22 is mounted between the second fiber optic 26 and the detection system 20. The advantage of this alternate embodiment is that the light source 16 and the detection system 20 can be located at the same location and the grating 14 may be located at a location distant from the light source 16 and the detection system 20. Therefore, this arrangement is most likely to be preferred to the arrangement of FIG. 1. Thus, all of the following embodiments will be shown and described with reference to this type of layout where the light source and the detection system are located at the same end of the sensor. It will be understood, however, that each of the following embodiments could be arranged with the light source and the detection system located at opposite ends of the sensor.

Figure 3:
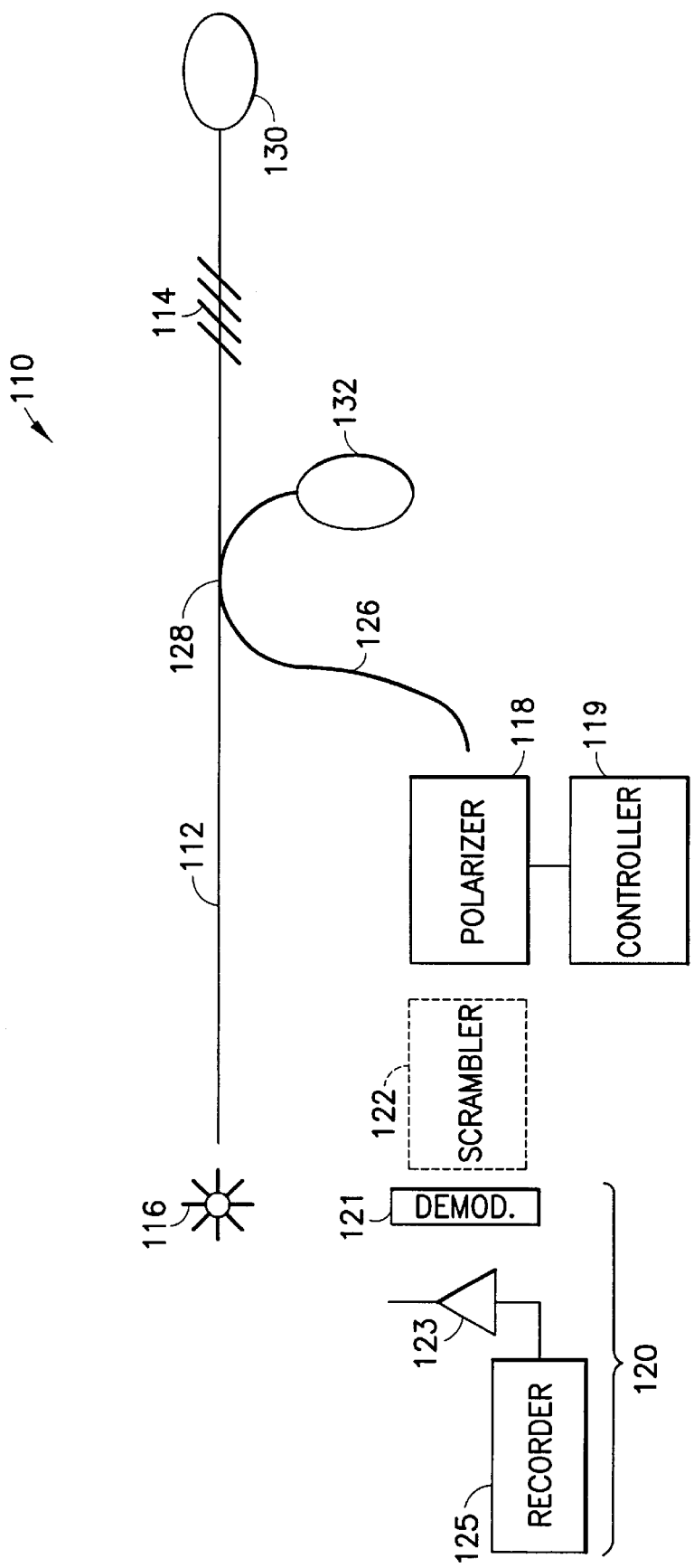
FIG. 3 is a schematic diagram of a second embodiment of the invention.

Turning now to FIG. 3, a second embodiment of a fiber optic sensor system 110 includes a fiber optic core 112 having one or more gratings 114 written onto it, an unpolarized broad band light source 116 coupled to one end of the fiber optic core 112. A second fiber optic core 126 is coupled to the first fiber optic core 112 by a beam splitter 128. The free end of the fiber optic 112 is terminated with a terminator 130. One end of the fiber optic 126 is coupled to a detection system 120 with a scrambler 122 and a polarizer 118 having a controller 119 interposed between the fiber 126 and the detection system. The other end of the fiber optic 126 is terminated with a terminator 132. This embodiment functions in substantially the same way as the first embodiment but with the polarizer and controller being located near the detection system rather than near the light source.

Those skilled in the art will appreciate that the controller 119 alters the orientation of the polarizer so that one polarization state of the light exiting the sensor is minimized. It will be understood that the same result can be accomplished without the controller 119 by using a polarization rotator between the polarizer 118 and the fiber 126. A polarization rotator has the effect of rotating the polarization axes of the light exiting the fiber. It will also be understood that by duplicating some of the components shown in FIG. 3, the sensor system can be made to detect two peaks simultaneously. In particular, a second detector 120, scrambler 122, polarizer 118, and controller 119 can be added to the system 110 utilizing a second fiber 126, beam splitter 128 and terminator 132. With this type of arrangement, the first polarizer would be adjusted to find one peak and the second polarizer would be adjusted to find the other peak.

Figure 4:
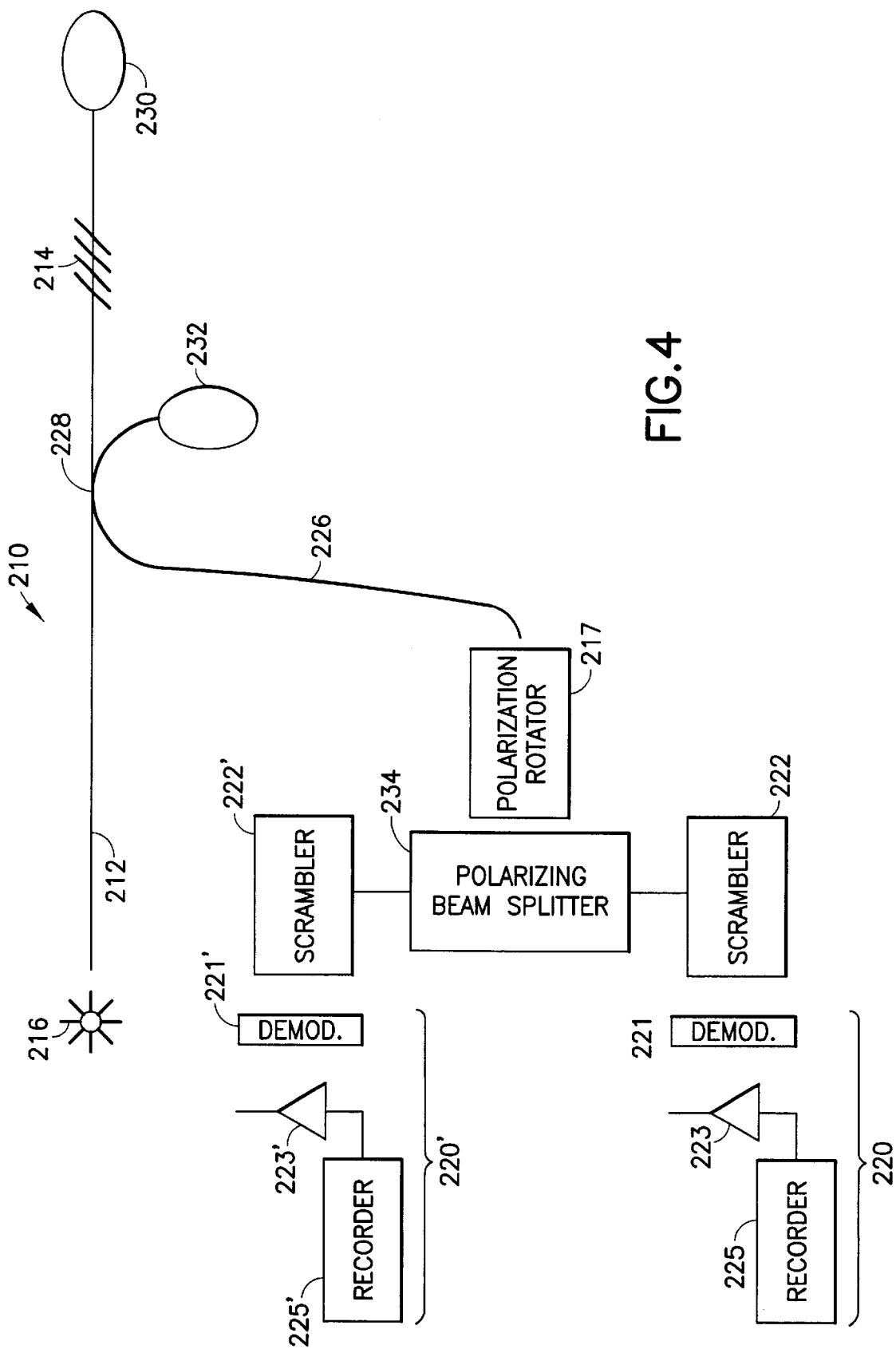
FIG. 4 is a schematic diagram of a third embodiment of the invention.

FIG. 4 illustrates a third embodiment of the invention which is similar to the second embodiment with similar reference numerals (increased by 100) referring to similar elements. The sensor system 210 includes a fiber optic core 212 having one or more gratings 214 written onto it, an unpolarized broad band light source 216 coupled to one end of the fiber optic core 212. A second fiber optic core 226 is coupled to the first fiber optic core 212 by a beam splitter 228. The free end of the fiber optic 212 is terminated with a terminator 230. One end of the fiber optic 226 is coupled to two detection systems 220, 220', each of which is provided with a scrambler 222, 222'. A polarizing beam splitter 234 is placed between a polarization rotator 217 and the two scramblers 222, 222'. Light exiting the fiber 226 enters the polarization rotator 217 where the polarization axes of the light are oriented so that light entering the beam splitter 234 exits as two orthogonally polarized beams, one toward each detection system 220, 220'. When the polarization orientation of the light exiting the fiber 226 is adjusted to the correct orientation using the polarization rotator, the beam splitter provides two beams each of which represent one of the two peaks. The two peaks are therefor detected simultaneously, one by each of the two detection systems.

Figure 7:
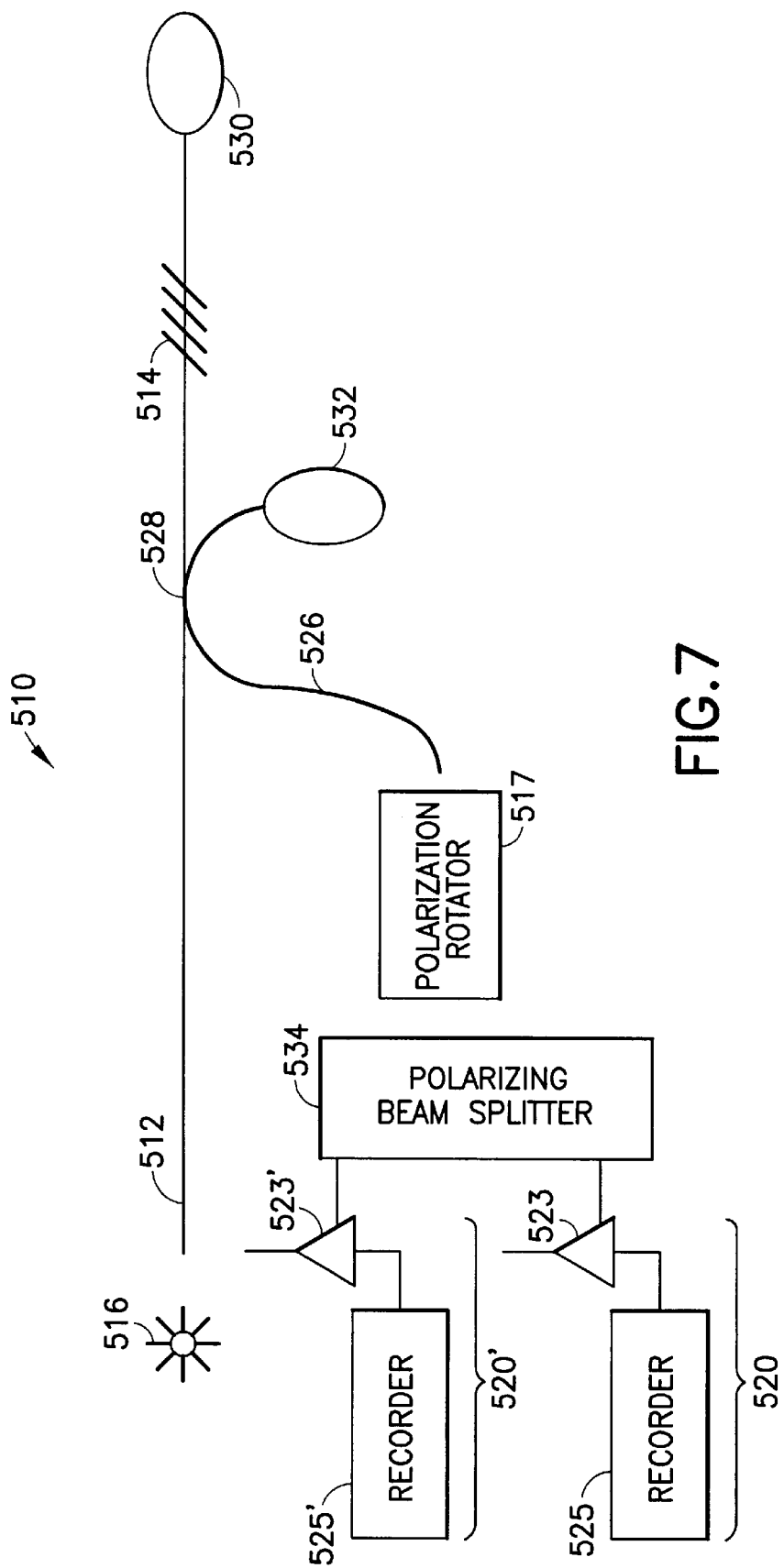
FIG. 7 is a schematic diagram of a sixth embodiment of the invention.

FIGS. 5–7 illustrate fourth through sixth embodiments which utilize tunable light sources (sometimes referred to as "interrogation systems"). The tunable light sources could be narrowband or broadband depending on their construction. If the tunable light source includes a broadband light source with a tunable filter (e.g., a Fabry-Perot filter), polarization scramblers can and should be used between the tunable filter and the FBG grating.

Turning now to FIG. 5, the fiber optic sensor system 310 according to the fourth embodiment of the invention includes a fiber optic core 312 having one or more gratings 314 written onto it, a tunable light source 316 with a polarizer 318 having a controller 319 mounted between the light source 316 and the fiber optic 312, and a detection system 320. A second fiber optic core 326 is coupled to the first fiber optic core 312 by a beam splitter 328 and the free end of the fiber optic 312 is terminated with a terminator 330. One end of the fiber optic 326 is coupled to the detection system 320 and the other end is terminated with a terminator 332. According to this embodiment, no special equipment is placed between the sensor and the detection system, and the detection system 320 includes a photo detector 323 and a recorder 325, but no spectral demodulator. The wavelength of the light source is tuned (swept) through the wavelength of the grating. As the polarization of the light entering the sensor is adjusted to the correct orientation, a first peak is detected. Further adjustment of the polarization (±90°) and the wavelength of the light source allows a second peak to be detected.

FIG. 6 shows a fifth embodiment which is similar to the fourth embodiment with similar reference numerals (increased by 100) referring to similar elements. According to this embodiment, the polarizer 418 and controller 419 are placed between the sensor and the detection system 420 rather than between the sensor and the light source. The wavelength of the light source is tuned through the wavelength of the grating. As the polarization of the light exiting the sensor is adjusted to the correct orientation, a first peak is detected. Further adjustment of the polarization (±90°) allows a second peak to be detected as the tunable light source is tuned to the wavelength of the second peak. As mentioned above, if the tunable light source 416 includes a broadband light source with a tunable filter (e.g., a Fabry-Perot filter), a polarization scrambler 422 can and should be used between the tunable filter and the FBG grating 414.

FIG. 7 shows a sixth embodiment which is similar to the fifth embodiment with similar reference numerals (increased by 100) referring to similar elements. This embodiment, like the third embodiment shown in FIG. 4, has two detection systems 520, 520' and a polarizing beam splitter 534 which couples the two detection systems to a polarization rotator 517. Light exiting the polarization rotator 517 enters the beam splitter 534 where two orthogonally polarized beams exit, one toward each detection system 520, 520'. When the polarization axes of the light are adjusted to the correct orientation using the polarization rotator, the beam splitter provides two beams each of which represent one of the two peaks. The two peaks are therefor detected simultaneously, one by each of the two detection systems.

Figure 8:
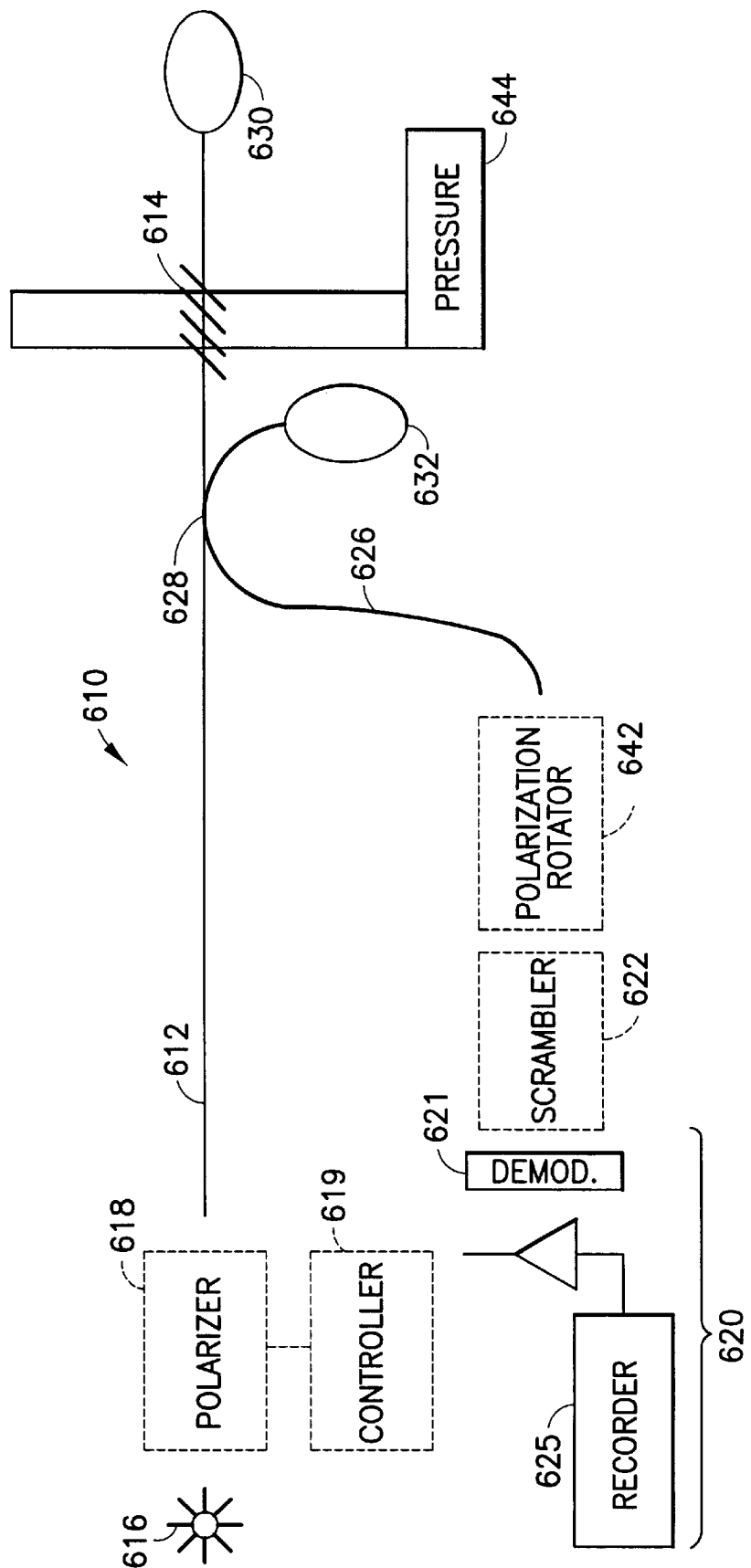
FIG. 8 is a schematic diagram of an experimental apparatus which produced the results shown in FIGS. 9–11.

The concepts of the present invention were tested using experimental apparatus such as the apparatus 610 shown schematically in FIG. 8. The apparatus 610 is similar to the apparatus 10' shown in FIG. 2 with the same reference numerals (increased by 600) referring to similar components. In the apparatus 610, the polarizer 618 and the scrambler 622 are removable from the apparatus. In addition, a polarization rotator 642 is removably added to the apparatus. In order to make meaningful measurements, a known source of pressure 644 is applied to the fiber 612 at the grating 614. In one of the actual experimental embodiments, the fiber 612 was a single mode fiber, the light source 616 was an erbium doped fiber light source (AFC BBS1550-TS), the polarizer 618 was a PM fiber (3M Fs-PZ-7626) and the controller 19 was a fiber loop controller (Thorlabs, Inc. FPC). The spectral demodulator 621 was a Fabry-Perot filter from Micron Optics, Atlanta, Ga. The scrambler 622 in the experimental embodiment was fabricated by fusion splicing together two unequal lengths of PM fiber at 45° from their preferred orientation. In one of the experimental embodiments, the pressure apparatus 644 was a piston. In another of the experimental embodiments, side hole fiber was used and the pressure included a ⅛" tube into which the side hole fiber 612 with the grating 614 was set and onto which pressure was applied.

Figure 9:
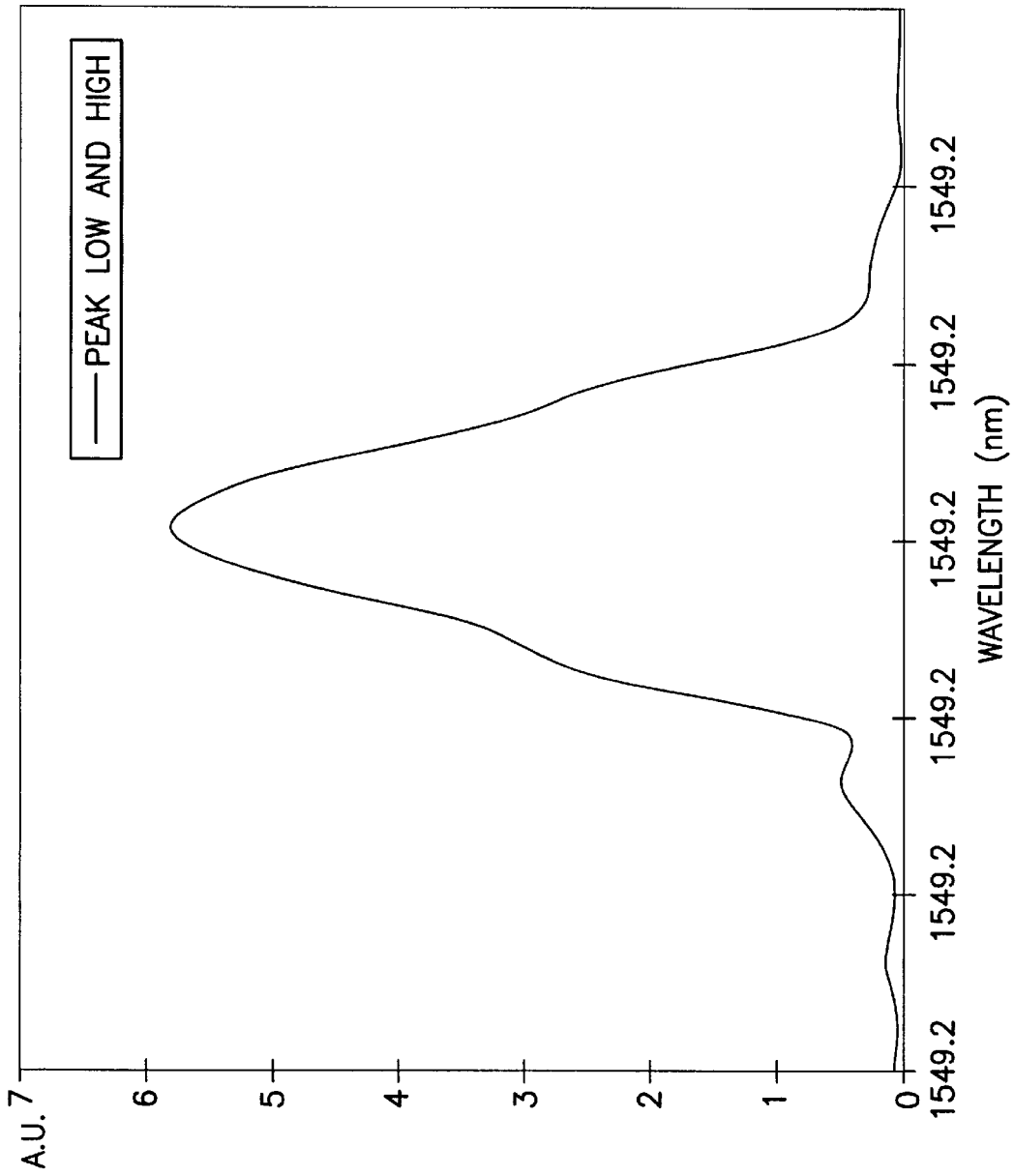
FIG. 9 is a graph of the spectrum of light detected at 2,000 psi without the polarization control of the invention.
Figure 10:
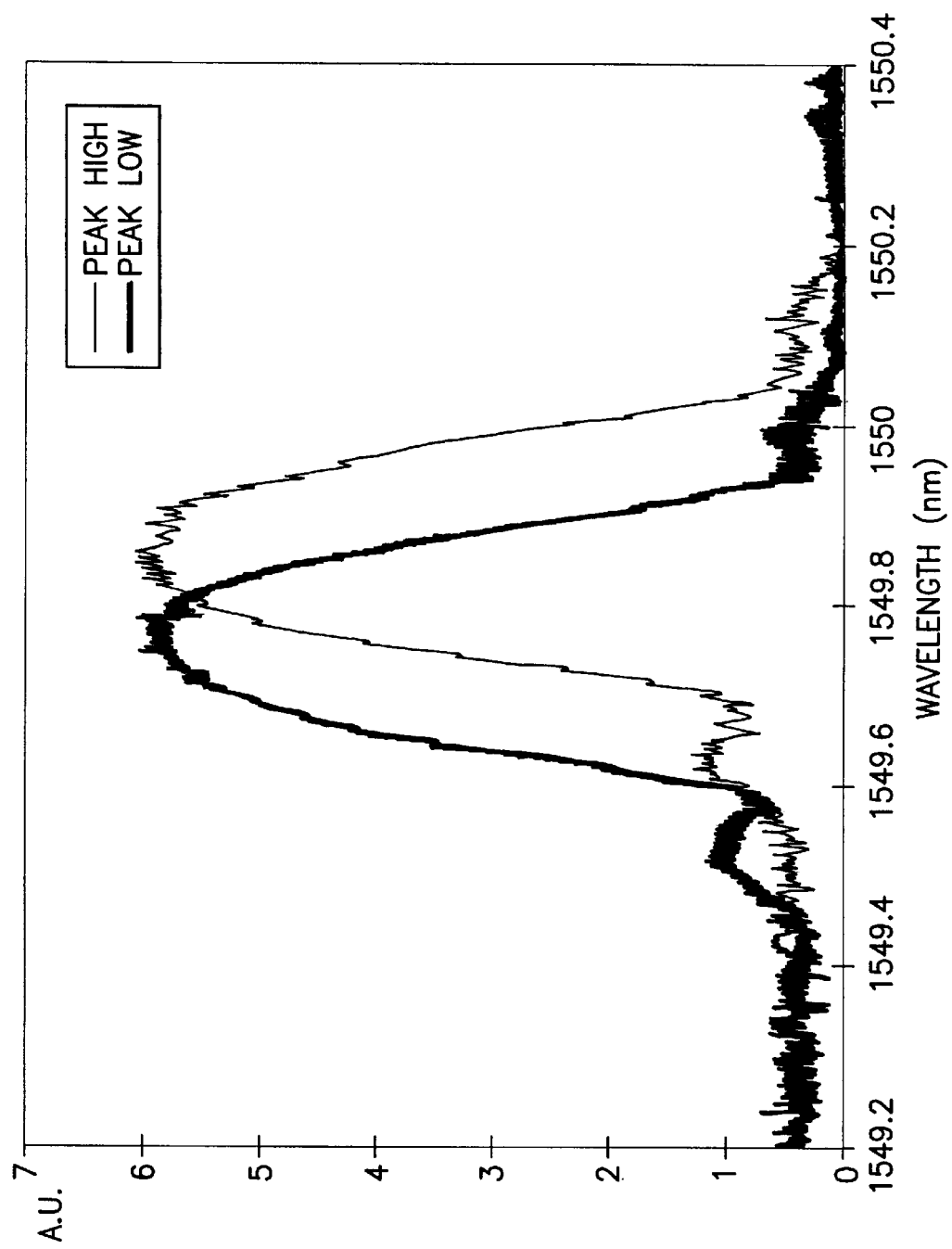
FIG. 10 is a graph of the spectrum of light detected at 2,000 psi with the polarization control of the invention.

As mentioned above and discussed in co-owned U.S. Pat. No. 5,841,131, conventional fiber optic pressure sensors which utilize one or more Fiber Bragg Gratings (FBGs) in side hole fibers do not produce a double peaked spectrum at low pressures. Utilizing the experimental apparatus 610 of FIG. 8, with the polarizer 618, the controller 619, the scrambler 622, and the polarization rotator 642 removed from the system, the fiber 612 at the grating 614 was subjected to a pressure of 2,000 psi. FIG. 9 illustrates the spectrum produced with this experimental set-up. Utilizing the experimental apparatus 610 of FIG. 8, with the polarizer 618 and controller 619 in place, but with the scrambler 622 and the polarization rotator 642 not in place, the fiber 612 at the grating 614 was subjected to a pressure of 2,000 psi. The polarizer 618 was rotated with the controller 619 until a first peak (for example the heavy weight line peak shown in FIG. 10) was detected by the detection system 620. The polarizer 618 was rotated approximately 90° and the second peak (for example the light weight line peak shown in FIG. 10) was detected by the detection system 620.

Figure 11:
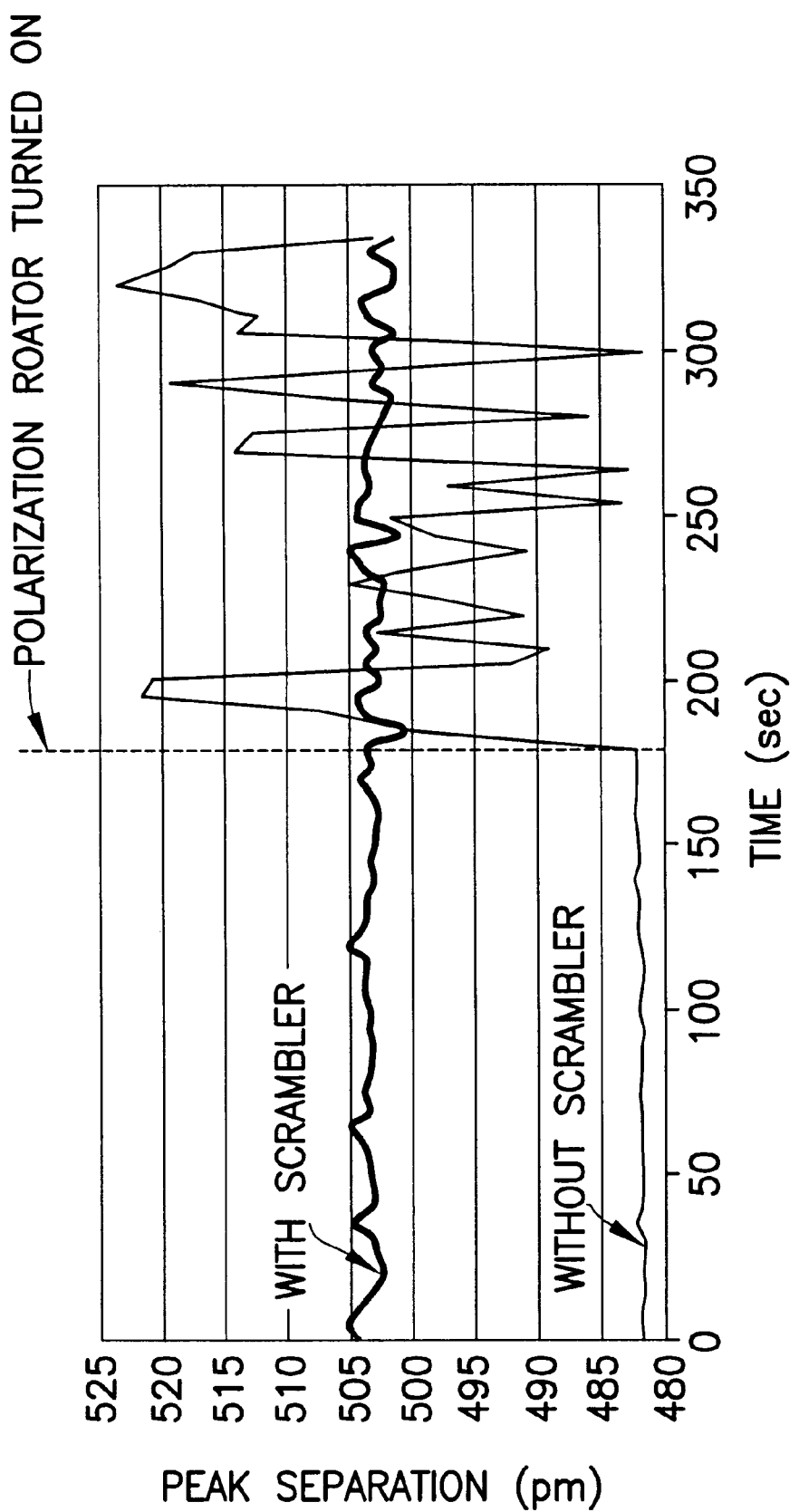
FIG. 11 is a graph illustrating the results of an experiment with the scrambler according to the invention.

FIG. 11 illustrates the results of an experiment to determine the sensitivity of a spectral demodulation system to the polarization of light. Utilizing an experimental apparatus like 610 of FIG. 8, with the polarizer 618, the controller 619, and the scrambler 622 removed, but with the polarization rotor 642 in place and turned off, the fiber 612 at the grating 614 was subjected to a constant pressure. The output of the demodulation system 20 was monitored for a period of 175 seconds and the change in the output signal was recorded. As shown in the lower left hand corner of FIG. 11, the output (shown as a light weight line) remains relatively constant.

Utilizing an experimental apparatus like 610 of FIG. 8, with the polarizer 618, the controller 619, and the scrambler 622 removed from the system, but with the polarization rotor 642 in place and turned on, the fiber 612 at the grating 614 was subjected to a constant pressure. The light weight line on the right side of FIG. 11 shows that the output of the detection system 620 varies substantially over time as the polarization state of the light changes. The change in output is as much as ±20 picometers. This demonstrates that in a practical application, where the fiber is subjected to movement which changes the polarization state of the light viewed by the detection system, measurement errors on the order of ±20 picometers can be expected.

Utilizing an experimental apparatus like 610 of FIG. 8, with the polarizer 618 and the controller 619 removed from the system, but with the scrambler 622 installed and the polarization rotor 642 in place and turned off, the fiber 612 at the grating 614 was subjected to a constant pressure. The heavy weight line on the left hand side of FIG. 11 illustrates that the output varies about ±2.5 picometers over time. With the same system, the polarization rotor 642 was turned on and the output measured over time. The heavy weight line on the right side of FIG. 11 illustrates that the output is not significantly changed by the polarization rotor 642. This demonstrated that, although the scrambler introduces some small amount of noise into the system, it prevents noise an order of magnitude greater. It is believed that a more sophisticated scrambler can reduce the noise even below the ±2.5 picometers observed in this experiment.

There have been described and illustrated herein several methods and apparatus for enhancing the dynamic range, sensitivity, accuracy, and resolution in fiber optic pressure sensors. It is believed that the methods and apparatus of the invention can be useful with any type of fiber optic sensor which is capable of producing two peaks from a grating. Moreover, it is believed that the invention has significant utility when retrofit to an existing sensor system. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A fiber optic sensor system, comprising:
   a) a light source;
   b) an optical fiber having at least one grating written onto it, said optical fiber being coupled to said light source;
   c) a first detection system coupled to said optical fiber for detecting light reflected from or transmitted through said at least one grating; and
   d) adjustable means for altering the polarization character of light coupled between said light source and said first detection system such that two peaks are detected by said first detection system and the distinction between the peaks is enhanced by said adjustable means for altering the polarization character.

2. A fiber optic sensor system according to claim 1, wherein:
   said means for altering the polarization character of light includes a polarizer and a polarizer controller.

3. A fiber optic sensor system according to claim 2, wherein:
   said polarizer is mounted between said light source and said optical fiber such that light from said light source is polarized by said polarizer before entering said optical fiber.

4. A fiber optic sensor system according to claim 2, wherein:
   said polarizer is mounted between said first detection system and said optical fiber such that light from said optical fiber is polarized by said polarizer before entering said first detection system.

5. A fiber optic sensor system according to claim 1, wherein:

said light source is a polarized light source and said means for altering the polarization character of light includes a polarization rotator for changing the orientation of polarization axes of said polarized light.

6. A fiber optic sensor system according to claim 1, wherein:
said means for altering the polarization character of light includes a depolarizing scrambler.

7. A fiber optic sensor system according to claim 6, wherein:
said depolarizing scrambler is mounted between said optical fiber and said first detection system such that light exiting said optical fiber is de-polarized before entering said first detection system.

8. A fiber optic sensor system according to claim 6, wherein:
said depolarizing scrambler is mounted between said optical fiber and said light source.

9. A fiber optic sensor system according to claim 6, wherein:
said means for altering the polarization character of light further includes a polarizer and a polarizer controller for changing the orientation of said polarizer.

10. A fiber optic sensor system according to claim 9, wherein:
said polarizer is mounted between said light source and said optical fiber such that light from said light source is polarized by said polarizer before entering said optical fiber.

11. A fiber optic sensor system according to claim 9, wherein:
said depolarizing scrambler is mounted between said optical fiber and said first detection system such that light exiting said optical fiber is de-polarized before entering said first detection system.

12. A fiber optic sensor system according to claim 11, wherein:
said polarizer is mounted between said light source and said optical fiber such that light from said light source is polarized by said polarizer before entering said optical fiber.

13. A fiber optic sensor system according to claim 11, wherein:
said polarizer is mounted between said optical fiber and said depolarizing scrambler such that light from said optical fiber is polarized by said polarizer before entering said depolarizing scrambler.

14. A fiber optic sensor system according to claim 9, wherein:
said depolarizing scrambler is mounted between said polarizer and said first detection system.

15. A fiber optic sensor system according to claim 1, further comprising:
e) a second detection system; and
f) a beam splitter, wherein
said first and second detection systems are coupled to said optical fiber through said beam splitter.

16. A fiber optic sensor system according to claim 15, wherein:
said means for altering the polarization character of light coupled between said light source and said first detection system includes means for orienting the polarization axes of light directed towards said first and second detection systems such that one polarization axis is directed toward said first detection system and another polarization axis is directed toward said second detection system.

17. A fiber optic sensor system according to claim 16, wherein:
said beam splitter is a polarizing beam splitter and said means for orienting the polarization axes includes a polarization rotator mounted between said polarizing beam splitter and said optical fiber.

18. A fiber optic sensor system according to claim 17, wherein:
said means for altering the polarization character of light includes
a first depolarizing scrambler mounted between said polarizing beam splitter and said first detection system, and
a second depolarizing scrambler mounted between said polarizing beam splitter and said second detection system.

19. A method of enhancing the sensitivity of a fiber optic sensor system having an optical fiber with at least one grating written thereon, a light source coupled to the fiber, and a detection system coupled to the fiber, said method comprising:
a) altering the polarization character of the light generated by the light source before it reaches the detection system such that two peaks are detected by the detection system and the distinction between the peaks is enhanced.

20. A method to claim 19, wherein:
said step of altering the polarization character of the light generated by the light source before it reaches the detection system includes
placing a polarizer between the light source and the detection system; and
adjusting the orientation of the polarizer so that the detection system detects two peaks, one at a time.

21. A method according to claim 20, wherein:
said step of placing a polarizer between the light source and the detection system includes placing the polarizer between the light source and the fiber optic.

22. A method according to claim 20, wherein:
said step of placing a polarizer between the light source and the detection system includes placing the polarizer between the fiber optic and the detection system.

23. A method according to claim 19, wherein:
said step of altering the polarizing character of the light generated by the light source before it reaches the detection system includes
placing a polarizer between the light source and the detection system; and
adjusting the orientation of the polarizer so that the detection system detects two peaks simultaneously.

24. A method according to claim 19, wherein:
said step of altering the polarization character of the light generated by the light source before it reaches the detection system includes
polarizing the light source; and
placing a polarization rotator between the light source and the detection system.

25. A method according to claim 19, wherein:
said step of altering the polarization character of the light generated by the light source before it reaches the detection system includes placing a depolarizing scrambler between the light source and the detection system.

26. A method according to claim 25, wherein:
said step of placing a depolarizing scrambler between the light source and the detection system includes placing a depolarizing scrambler between the fiber optic and the detection system.

27. A method according to claim 25, wherein:

said step of placing a depolarizing scrambler between the light source and the detection system includes placing a depolarizing scrambler between the fiber optic and the light source.

28. A method according to claim 25, wherein:

said step of altering the polarization character of the light generated by the light source before it reaches the detection system includes
placing a polarizer between the light source and the detection system; and
adjusting the orientation of the polarizer so that the detection system detects two peaks, one at a time.

29. A method according to claim 28, wherein:

said step of placing a polarizer between the light source and the detection system includes placing a polarizer between the light source and the fiber optic.

30. A method according to claim 28, wherein:

said step of placing a depolarizing scrambler between the light source and the detection system includes placing a depolarizing scrambler between the polarizer and the detection system.

31. A method according to claim 30, wherein:

said step of placing a polarizer between the light source and the detection system includes placing a polarizer between the light source and the fiber optic.

32. A method according to claim 30, wherein:

said step of placing a polarizer between the light source and the detection system includes placing the polarizer between the fiber optic and the scrambler.

33. A method according to claim 25, wherein:

said step of altering the polarization character of the light generated by the light source before it reaches the detection system includes
placing a polarizer between the light source and the detection system; and
adjusting the orientation of the polarizer so that the detection system detects two peaks simultaneously.

34. A method of enhancing the sensitivity of a fiber optic sensor system having an optical fiber with at least one grating written thereon, a light source coupled to the fiber, and two detection systems coupled to the fiber, said method comprising:

a) splitting the light exiting the fiber into two beams, one for each detection system; and b) altering the polarization character of the light generated by the light source before it reaches the detection systems such that two peaks are detected by the detection system and the distinction between the peaks is enhanced.

35. A method according to claim 34, wherein:

said step of altering the polarization character of light generated by the light source before it reaches the detection systems includes orienting the polarization axes of light directed toward the detection systems such that one polarization axis is directed toward one detection system and another polarization axis is directed toward the other detection system.

36. A method according to claim 35, wherein:

said step of splitting the light exiting the fiber into two beams is performed with a polarizing beam splitter and said step of orienting the polarization axes is performed with a polarization rotator mounted between the polarizing beam splitter and the optical fiber.

37. A method according to claim 35, wherein:

said step of altering the polarization character of light includes
depolarizing the light entering the detection systems.

* * * * *